(12) United States Patent
Wirth et al.

(10) Patent No.: US 6,349,805 B1
(45) Date of Patent: Feb. 26, 2002

(54) BRAKE LINING MOUNTING, ESPECIALLY FOR RAIL VEHICLES

(75) Inventors: Xaver Wirth, Ismaning; Mathias Schörwerth, Geretsried; Robert Weiss, Karlsfeld, all of (DE)

(73) Assignee: Knorr-Bremse Systeme Für Schienenfahrzeuge GmbH, Munich (DE)

(*) Notice: Subject to any disclaimer, the term of this patent is extended or adjusted under 35 U.S.C. 154(b) by 0 days.

(21) Appl. No.: 09/423,213
(22) PCT Filed: Feb. 24, 1999
(86) PCT No.: PCT/EP99/01187
  § 371 Date: Jan. 24, 2000
  § 102(e) Date: Jan. 24, 2000
(87) PCT Pub. No.: WO99/45291
  PCT Pub. Date: Sep. 10, 1999

(30) Foreign Application Priority Data

Mar. 5, 1998 (DE) .......................... 198 09 513

(51) Int. Cl.$^7$ ............................................. F16D 65/04
(52) U.S. Cl. .................... 188/234; 188/250 B; 188/243
(58) Field of Search ........................ 188/250 B, 250 R, 188/68, 119, 234, 242, 243, 244, 245

(56) References Cited

U.S. PATENT DOCUMENTS

| | | | |
|---|---|---|---|
| 1,941,656 A | 1/1934 | Blume | 188/234 |
| 3,800,920 A | * 4/1974 | Warwick | 188/106 F |
| 4,090,591 A | * 5/1978 | Pollinger et al. | 188/73.1 |
| 4,371,061 A | * 2/1983 | Ottewell | 188/244 |
| 5,495,921 A | * 3/1996 | Samulak et al. | 188/202 |
| 5,934,418 A | * 8/1999 | Wirth | 188/73.1 |
| 6,092,582 A | * 7/2000 | Liu | 160/310 |

FOREIGN PATENT DOCUMENTS

| | | |
|---|---|---|
| DE | 3908287 A1 | 9/1990 |
| DE | 9307017.9 | 8/1993 |
| DE | 4436457 A1 | 4/1996 |
| EP | 0837260 A1 | 4/1998 |
| FR | 2 365 726 | 4/1978 |

OTHER PUBLICATIONS

Attachment #1, enlargement of figure 6 of German doc. #DE4436457A1.*

* cited by examiner

Primary Examiner—Matthew C. Graham
Assistant Examiner—Xuan Lan Nguyen
(74) Attorney, Agent, or Firm—Barnes & Thornburg

(57) ABSTRACT

The invention relates to a brake lining mounting, especially for rail vehicles, comprising a lining support which is encompassed at both of its longitudinal ends by guide sections, preferably at least partially by the plates of a lining holder which holds the friction lining. A pin is provided on the lining support and is able to move perpendicularly to the lining support. When the pin is placed under spring tension as the lining holder is pushed up onto the lining support, the pin extends through an opening provided in the lining holder in such a way that the lining holder is stopped on the lining support by this single pin and cannot move in relation to the lining support. At least one spring in the form of a spring clip acts on the pin. The spring clip can be moved into a raised release position against the force of its own tension, carrying the pin with it. The pin is thus released from its engagement with the opening in the lining holder in such a way that when the pin is in its release position, the lining holder can be pushed away from the lining support.

15 Claims, 4 Drawing Sheets

BRAKE LINING MOUNTING, ESPECIALLY FOR RAIL VEHICLES

BACKGROUND AND SUMMARY OF THE INVENTION

The invention relates to a brake lining mounting and more specifically, to slide mounting of brake lining with a lock.

In the case of known brake lining mountings, which have a so-called dovetail guide, a face-side stop is provided for the inserted brake lining as well as a cross bar which can be swivelled after the brake lining is slid in. This crossbar can also be guided on the support in a foldable or rotatable manner. Such supports are known as UIC supports.

In another known construction, two offset pins are provided at a distance from the friction lining length on the support. When the lining holder is inserted, semicircular recesses of the holder plate reach behind the two pins. The detaching of the lining holder from the lining support is prevented by means of a lock spring of the lining support which reaches behind a holding lug of the lining holder. Lining supports are also known, wherein the lining is held by two pins, one pin being situated on a swivellable locking bar which can be opened up for changing the lining.

The standard solutions have in common that the friction or brake linings are held at both ends by means of stops. A lining, which is "enclosed" in such a manner, must therefore be provided with a larger axial play so that it is not clamped in during the heating (several 100° C. during braking). The result would be damage to the support or deformations of the lining. However, the larger plays in dynamically loaded components which take this situation into account are the reason for a premature wearing-out of the mutually contacting parts. In addition, increased rattling noises are to be expected here.

Based on the above, it is an object of the invention to further develop a brake lining mounting of the initially mentioned type such that, in its assignment to the brake lining support, the brake lining will not be exposed to the above-mentioned problems. Simultaneously, the possibility is to be provided of mounting the lining holder carrying the brake lining in a simple and fast manner on the lining support and demounting it therefrom.

The features of the present invention are used for achieving this object.

Because of the use of a single pin on one of the front ends of the lining support, the fixing, thus the non-displaceable arresting of the lining holder with respect to the lining support is ensured. As the result of the guides which exist between the lining holder and the lining support and which are in a mutual engagement, the lining holder can be pushed in a simple manner onto the lining support when the pin is in the release position. Until the opening situated at the front end of the lining holder comes to be congruent with the pin, and under the spring force, this pin can be released into its arresting position. The demounting of the lining holder takes place in a correspondingly simple manner after the pin has been lifted out of its arresting position. The lining holder preferably has a symmetrical configuration; that is, on each of the two front ends, the opening is situated which is used for accommodating the pin. This means that the lining holder with the brake lining can be used in a left-hand as well as in a right-hand construction on lining supports. In which case, in the mounted position, one of the openings respectively of the front ends remains open.

The releasing of the pin, thus the lifting of this pin out of the opening of the lining holder, can be carried out in a simple manner manually or by means of a lever-type tool. For exercising a spring force on the pin, a spring clip and a spring acting within the lining support with respect to the pin are preferably provided. This represents a safety aspect during the arresting of the lining holder.

Advantageous developments and further developments are indicated in the additional claims.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
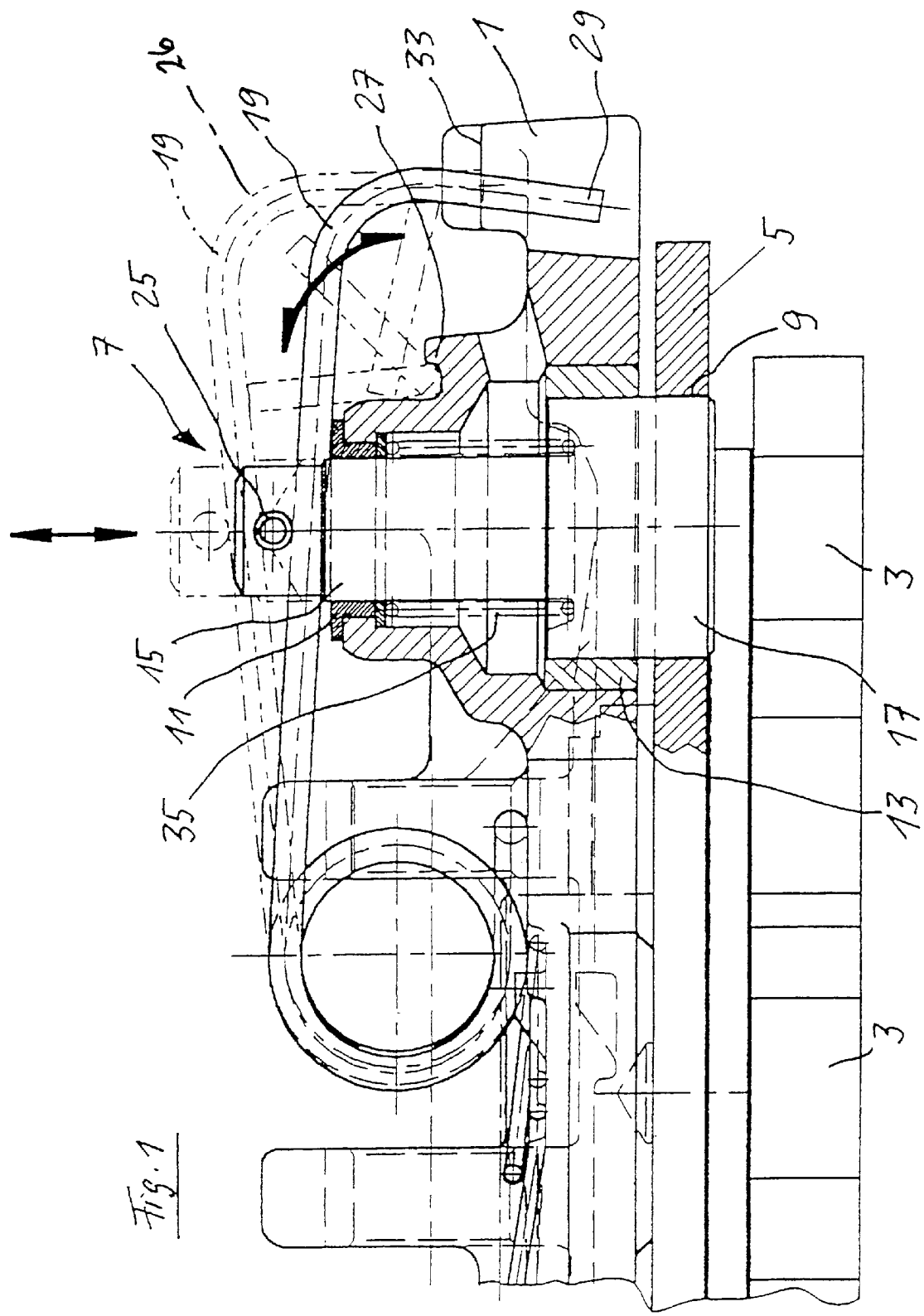
FIG. 1 is a partially cut partial lateral view of the front end of a lining support with a lining holder guided thereon, illustrating the pin forming the locking between the lining support and the lining holder, the position of the spring clip in the arresting position being indicated by solid lines and in the release position being indicated by dash-dotted lines.

In a partially cut partial lateral view, FIG. 1 of the drawing shows a lining support 1 on which a lining holder 5 is mounted which carries a friction lining 3. In a manner not explained in detail, the friction lining 3 consists of several lining elements which are mounted swivellably in all directions on the lining holder 5 under spring tension. By means of lugs forming grooves, the lining holder 5 can be pushed onto the lining support 1. The lugs reach such on both sides of the lining support 1 around guide strips, which preferably extend in a curved manner. Thus the lining holder 5 with the lining elements mounted on it can be slid from one of the front sides, preferably from the front side of the lining support facing the rail, onto this lining support 1.

According to FIG. 1, a pin 7 is guided on the lining support 1 and penetrates, under spring tension (19, 35) an opening 9 of the lining holder 5 in its pushed-on position such that the lining holder 5 is secured against a displacement on the lining support 1. In its vertical position, the pin 7 can be displaced with respect to the lining support under spring tension and, in the illustrated embodiment, is guided in a bore of the lining support 1 which is offset in steps. The step-type bore is formed by bushing 11 and 13, of which the bushing 11 is pressed in from the top side of the lining support 1 and is used for guiding a narrow pin section 15. The wider pin section 17, which can be displaced through the underside of the lining support 1 is arranged in the bush 13 on the underside of the lining support 1.

Figure 2:
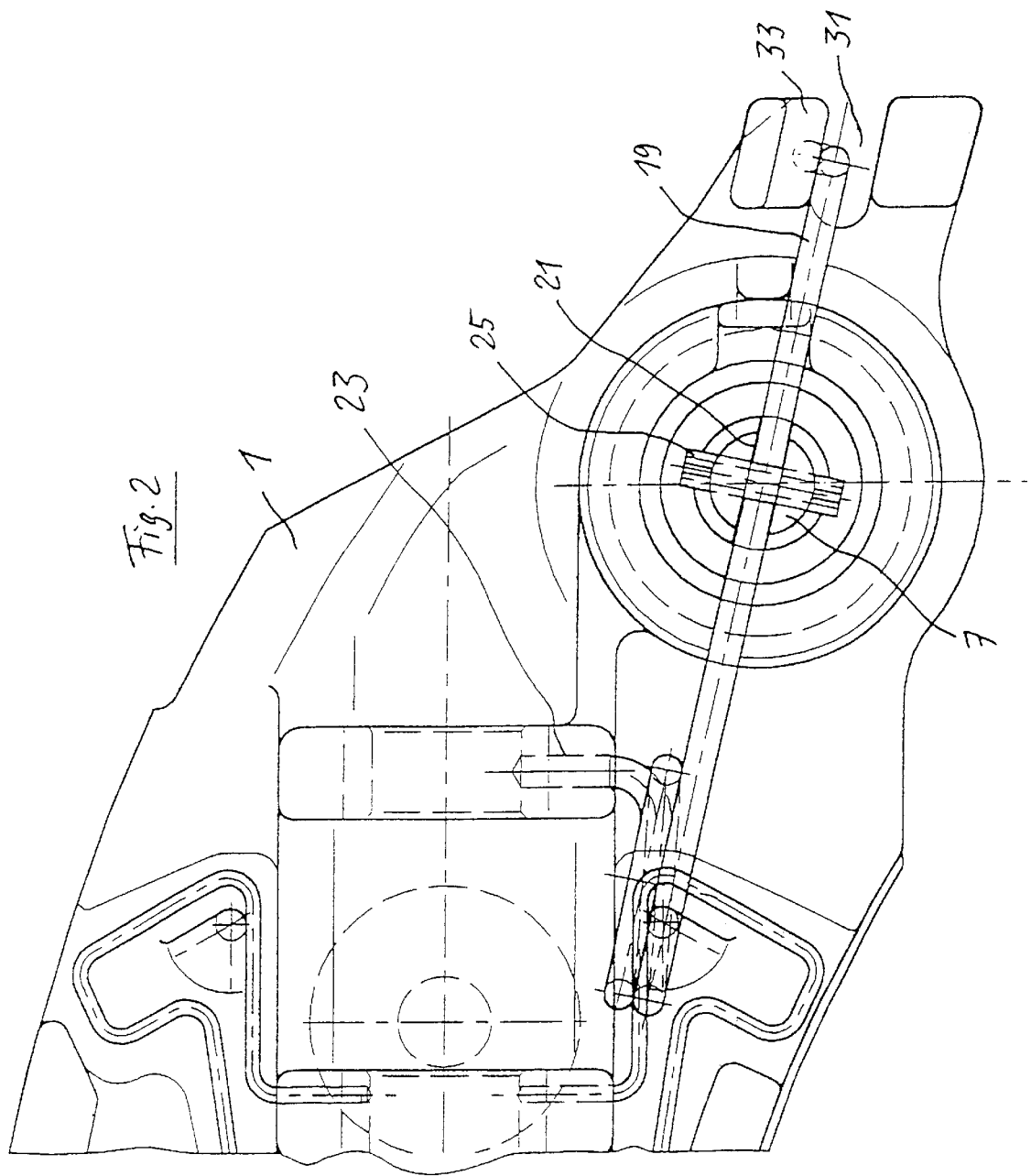
FIG. 2 is a partial top view of the arrangement according to FIG. 1 not showing the lining holder.

A spring clip 19 (FIGS. 1 and 2), which is preferably inserted in the center into a slot 21 on the top side of the pin 7, acts upon the top side of the pin 7. The end section of the spring clip 19, which is on the left in FIG. 1, is coiled twice, and the end of the spring clip is inserted in a bore 23 (FIG. 2) of the lining support 1. As the result of this shaping of the spring clip 19 in its section which is on the left in FIG. 1, the spring clip 19 has in its right section a downward-directed bracing such that the spring clip 19 has the tendency of displacing the pin 7 in the downward direction so that it extends into the opening 9 of the lining holder 5 and thereby arrests it with respect to a displacement.

The spring clip 19 is caught on the one side by the base of the slot 21 accommodating it in the pin head and, on the other side, is caught by a securing pin 25 penetrating the pin head. In the illustration according to FIG. 1, the securing pin 25 therefore extends above the spring clip 19. The pin 7 can be lifted from the arresting position illustrated in FIG. 1 in the upward direction into the opened position illustrated by a dash-dotted line, by means of a tool or manually. The spring clip 19 is lifted upward on its end which is on the right in the drawing. The spring clip 19 is therefore subject to a double function; that is, it can exercise a downward force with respect to the pin 7 and it is simultaneously used for lifting the pin out of its arresting position.

Depending on the spring force to be overcome, the lifting of the spring clip can take place manually, thus without any tool, but also by means of, for example, a flat tool 26 which, according to the dash-dotted representation in FIG. 1, is used on a shoulder 27 on the top side of the lining support and is rotated while acting with respect to the spring clip, until this spring clip 19 has reached the lifted position illustrated in FIG. 1 by a dash-dotted line. In order to hold the spring clip 19 in the lifted position, the end 29, which, in the lowered position, penetrates a slot 31 at the end of the lining support, can be placed on a step 33 laterally with respect to the slot 31. In this case, it is possible to provide the end 29 of the spring clip 19 in addition with a defined lateral bracing such that the spring clip automatically takes up the locking position on the step 33 when the end 29 is lifted out of the slot 31.

According to FIG. 1, a second spring 35 acts upon the pin 7, which spring 35 is supported on one side on the bush 11 and on the other side on the top side of the wider pin section 17. Like the spring clip 19, spring 35 has the tendency of displacing the pin 7 into the arresting position with respect to the lining holder illustrated in FIG. 1. In addition to the spring clip 19, the spring 35 is used for holding the pin 7 in the above-explained manner in its arresting position. The spring 35 simultaneously provides a certain safety function if the spring clip 19 should break during the operation. Thereby it is always ensured that the pin 7 cannot leave the arresting position with respect to the lining holder 5; that is, an unintentional detaching of the lining plate or of the lining holder 5 from the lining support 1 is absolutely impossible.

Figure 3:
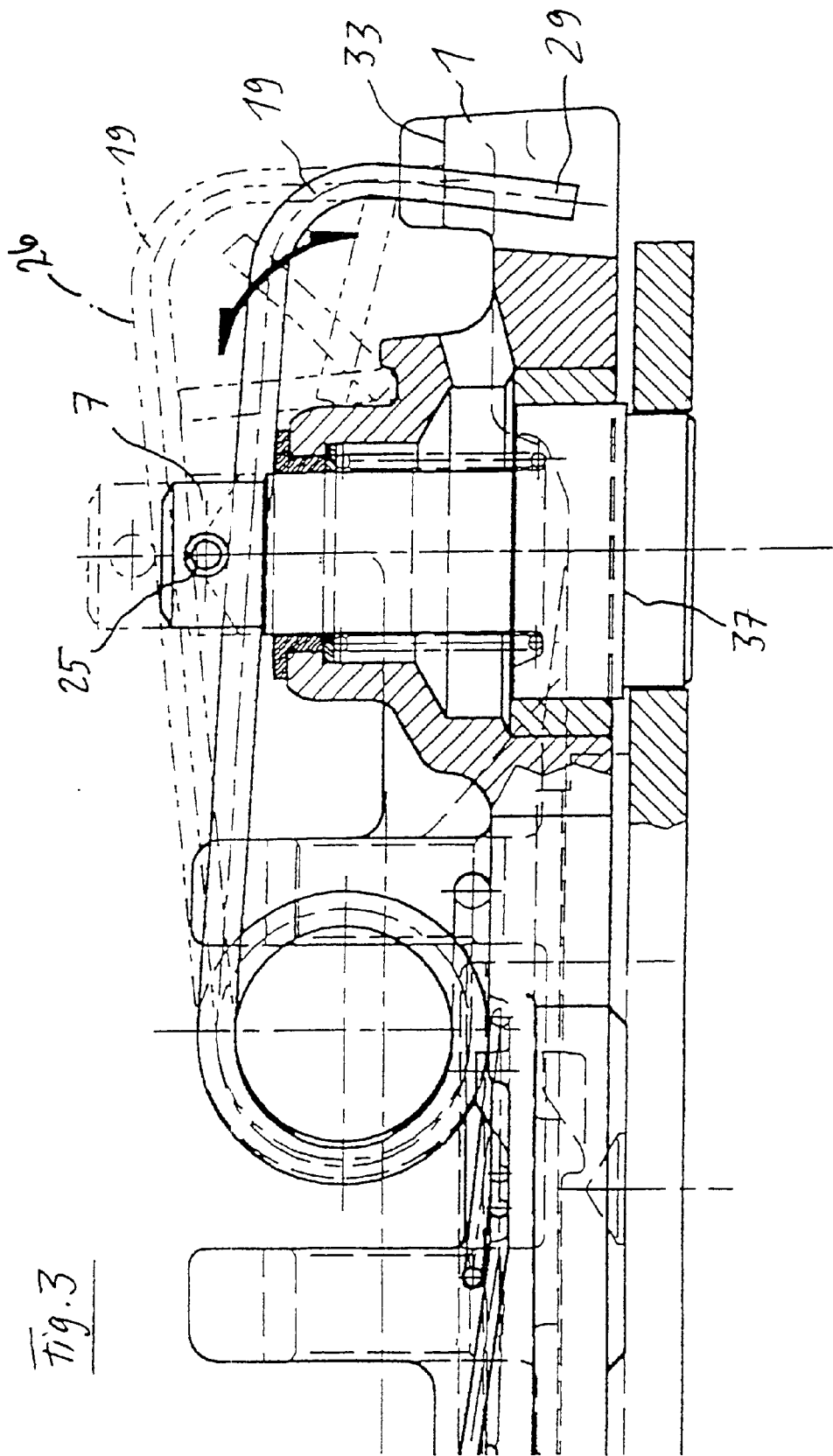
FIG. 3 is a view of another embodiment according to the invention which is comparable to that of FIG. 1.

In the case of the variant of the pin illustrated in FIG. 3, a step 37 is provided on this pin 7 in the area of the base of the lining support 1. The step 37 has a diameter which is slightly larger than the diameter of the opening 9 in the lining holder 5 receiving the pin end. This means that the pin cannot slide through the bore 9 in the lining holder 5 if, on the top side of the pin 7, the spring clip 19 and the securing pin 25 are unhooked or destroyed. In each case, it is avoided that the pin 7 slides through the opening 9 in the lining holder 5 and acts upon the back side of the friction lining 3 (which is not shown in FIG. 3). Furthermore, the step 37 defines precisely the insertion depth of the pin 7 in the opening 9 of the lining holder. A collision with the back side of the lining elements 3, etc. forming the friction lining is therefore prevented in a simple manner. Basically, it is also possible to provide, on the top side of the pin 7, a step in the form of a snap ring 19 which comes to rest, for example, on the bushing 13 and which determines the insertion depth of the pin 7. The spring clip 19 can also be used for this purpose if it is supported in its lowered position on the top side of the bushing 13 and, on its back side, catches the securing pin which is pulled downward under tension by the spring 35.

Figure 4:
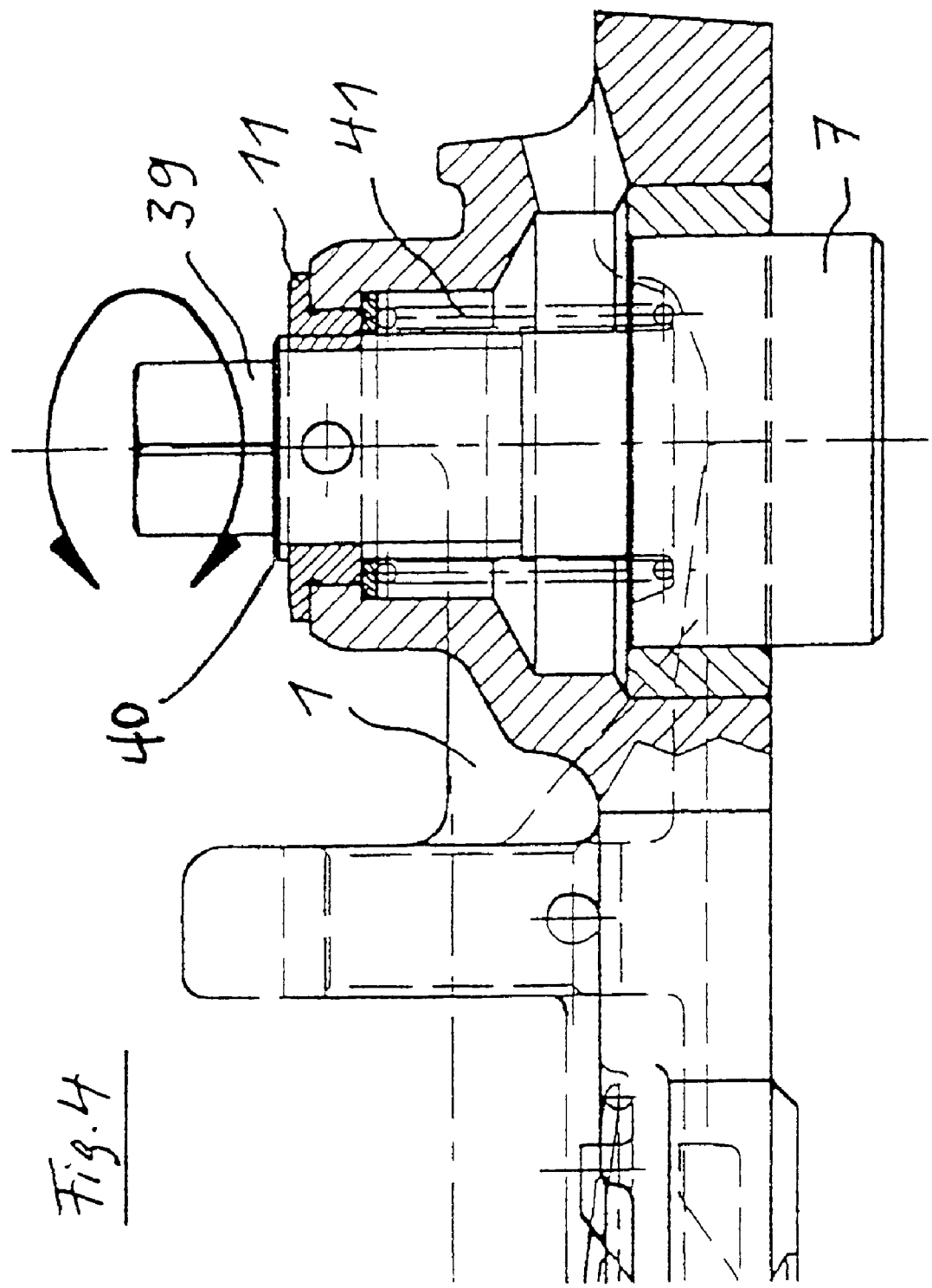
FIG. 4 is a view of another embodiment according to the invention which is comparable to that of FIGS. 1 and 3.

FIG. 4 of the drawing illustrates an embodiment in which the pin 7 is in a screwed connection with respect to the bore 40 receiving it in the lining support 1 by means of a non-self-locking movement thread. In the present case with respect to the bush 11. A spring 41 presses the pin 7 into the opening 9 while rotating. The pin head is constructed as a polygon 39 to which a tool can be applied in order to rotate the pin 7 for the purpose of the lifting out of the opening 9.

What is claimed is:

1. A brake lining mounting for a disc brake comprising:

a lining support;

a lining holder carrying a friction lining and slidably mounted from one of the front sides on the lining support in a transverse direction to brake application;

lugs, forming grooves, extend on both sides of the lining support around guide strips which extend from the lining support;

a single pin guided in the lining support and displaced perpendicularly to the sliding direction of the lining holder;

the pin being received in an opening on the lining holder when the opening is adjacent the pin in a mounting position of the lining holder; and wherein the lining holder and lining support are releasably secured to each other by the lugs, guide strips and pin.

2. A brake lining mounting according to claim 1, wherein a) when the lining holder is in the mounted position, the pin can be displaced under spring tension into the opening on the lining holder, and b) for the purpose of releasing the lining holder, the pin can be lifted under spring tension out of the opening of the lining holder.

3. A brake lining mounting according to claim 1, including a) a spring clip acting upon the pin head and displacing the pin into an arresting position in the opening of the lining holder, and (b) the spring clip, while taking along the pin, can be lifted into a release position in which the pin is lifted out of the opening of the lining holder.

4. A brake lining mounting according to claim 3, wherein a) the spring clip is inserted in a slot of the pin head and is caught between the slot bottom and a securing pin which can be inserted on the pin head, b) a first end section of the spring clip is fixed on the lining support, c) a second end section of the spring clip opposite the pin can be displaced between a lifted release position and a lowered arresting position.

5. A brake lining mounting according to claim 4 wherein the second end section of the spring clip can be arrested in the lifted release position on a top side of the lining support.

6. A brake lining mounting according to claim 4 wherein the second end section of the spring clip can be arrested in the lifted release position on a step on the top side of the lining support.

7. A brake lining mounting according to claim 3 wherein the pin is guided in a stepped bore of the lining support such that a pin section facing the opening has a larger diameter than an opposite pin section which carries the spring clip and which ends as a pin head.

8. A brake lining mounting according to claim 7, wherein the two pin sections of the pin are displaceably guided in bushings pressed into the lining support.

9. A brake lining mounting according to claim 8, including a second spring which tensions the pin in the direction of the opening of the lining holder.

10. A brake lining mounting according to claim 9, wherein
a) the second spring surrounds the pin section of the smaller diameter, and
b) the second spring is supported on one side on the underside of the bushing guiding the smaller diameter pin section and, on the other side, on the top side of the pin section of the larger diameter such that the second spring, is capable of tensioning the pin into the opening provided in the lining holder.

11. A brake lining mounting according to claim 9 wherein the second spring can be tensioned by lifting the pin by means of the spring clip.

12. A brake lining mounting according to claim 1 wherein the insertion depth of the pin with respect to the opening provided in the lining holder is determined by a step on the pin.

13. A brake lining mounting according to claim 1 wherein the pin is guided on the lining support (1) on a lower end of the lining support facing a rail.

14. A brake lining mounting according to claim 1, wherein the pin is screwed to a threaded bore of the lining support and by rotating, the pin can be inserted into the opening of the lining holder and can be lifted out of the opening.

15. A brake lining mounting according to claim 14, including a spring which surrounds the pin and tensions it in the direction of the opening of the lining holder.

* * * * *